United States Patent
Jeong

(10) Patent No.: US 9,452,734 B2
(45) Date of Patent: Sep. 27, 2016

(54) ANTICRIME SYSTEM USING PANIC FUNCTION OF VEHICLE

(71) Applicant: Taeseung Jeong, Incheon (KR)

(72) Inventor: Taeseung Jeong, Incheon (KR)

( * ) Notice: Subject to any disclaimer, the term of this patent is extended or adjusted under 35 U.S.C. 154(b) by 0 days.

(21) Appl. No.: 14/761,212

(22) PCT Filed: Mar. 28, 2014

(86) PCT No.: PCT/KR2014/002689
§ 371 (c)(1),
(2) Date: Jul. 15, 2015

(87) PCT Pub. No.: WO2014/163339
PCT Pub. Date: Oct. 9, 2014

(65) Prior Publication Data
US 2016/0009252 A1    Jan. 14, 2016

(30) Foreign Application Priority Data

Apr. 3, 2013 (KR) .......................... 10-2013-0036526

(51) Int. Cl.
| B60R 25/10 | (2013.01) |
| B60R 25/102 | (2013.01) |
| B60R 25/00 | (2013.01) |
| B60R 25/30 | (2013.01) |
| B60R 25/31 | (2013.01) |

(52) U.S. Cl.
CPC ............. B60R 25/102 (2013.01); B60R 25/00 (2013.01); B60R 25/30 (2013.01); B60R 25/31 (2013.01)

(58) Field of Classification Search
CPC ..... B60R 25/102; B60R 25/10; B60R 25/00; B60R 25/51

USPC ................ 340/426.1, 426.12, 426.22, 425.5; 307/10.12, 10.2
See application file for complete search history.

(56) References Cited

U.S. PATENT DOCUMENTS

| 6,181,238 B1 * | 1/2001 | Garrett, Sr. et al. .. B60R 25/104 307/10.2 |
| 6,288,635 B1 * | 9/2001 | Stouffer et al. ........ B60R 25/104 340/384.1 |
| 2001/0028297 A1 | 10/2001 | Hara et al. |
| 2006/0132294 A1 * | 6/2006 | Spark .................. B60R 25/1003 340/426.1 |

FOREIGN PATENT DOCUMENTS

| JP | 2001171452 | 6/2001 |
| JP | 2011254563 | 12/2011 |
| KR | 1019980039414 | 8/1998 |
| KR | 1010055680000 | 12/2010 |

* cited by examiner

Primary Examiner — Toan N Pham
(74) Attorney, Agent, or Firm — IPLA P.A.; James E. Bame

(57) ABSTRACT

An anticrime system using the panic function of a vehicle enables a person to utilize the panic function of another person's vehicle so as to make a criminal fall into a panic state when the criminal commits a crime in an area such as an alley, a residential street, or a main street side around which vehicles are usually parked, so that a victim may quickly escape from the criminal scene and notify the surrounding people of the criminal scene and circumstances to request help, thus preventing a crime from occurring. To this end, the panic function of a vehicle is operated only by the owner to be utilized by another person, so as to readily constitute an anticrime system with reduced cost by means of a plurality of vehicles parked almost everywhere in a city.

9 Claims, 1 Drawing Sheet

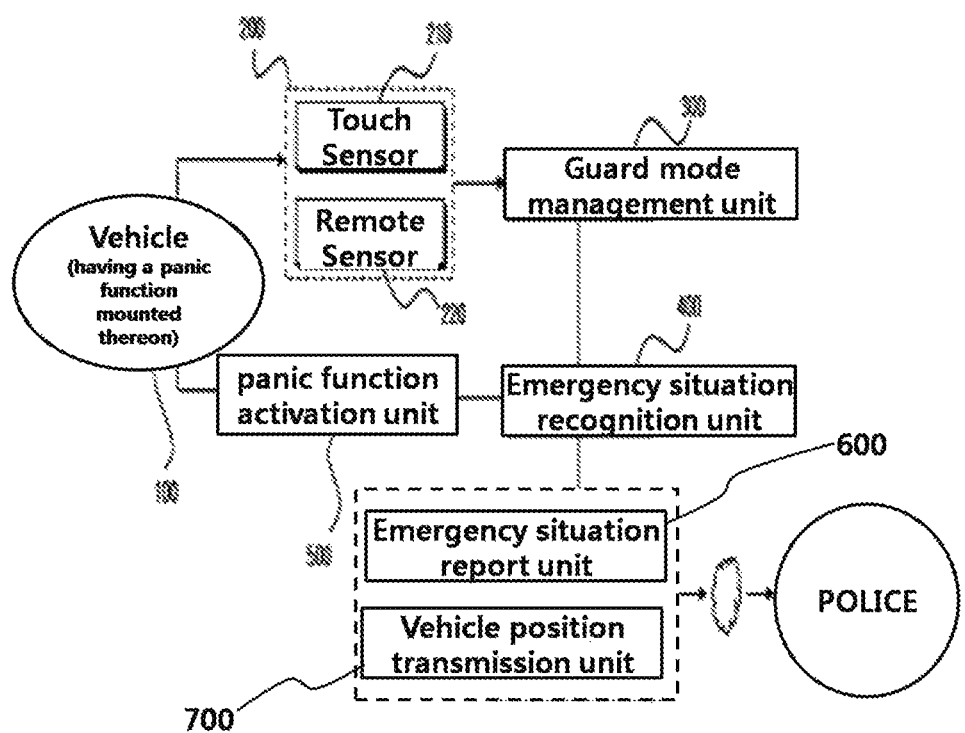

ANTICRIME SYSTEM USING PANIC FUNCTION OF VEHICLE

BACKGROUND

The present invention relates to an anticrime system, and in particular to an anticrime system using a panic function of a vehicle wherein a panic can be delivered to a criminal if a crime occurs in an area, for example, an alley, a residential area, and a roadside, where vehicles frequently park, so a victim can quickly escape from a crime spot, and the area where the crime has occurred and its surrounding situations can be quickly spread to others, thus asking any help, while preventing further crimes in a corresponding area. The anticrime system of the present invention can be previously installed during the manufacturing of a vehicle, so the panic function of the vehicle, which is naturally designed to operate by only a vehicle owner, can be used by anonymous people. A number of vehicles which may park anywhere in the city can be used as part of an anticrime system which a number of people can use since the anticrime system of the present invention can be easily installed at low cost.

In recent years, the crime occurrence ratio is sharply increasing in Korea. According to the statistics opened recently, among 22,034 sex crime cases which occurred in 2011, sex crime cases which occurred on streets amount to 2,765, which is highest, and sex crime cases which occurred in a residential area amount to 2,493 in a single housing and 2,082 in an apartment, a row house, and a multiplexing housing.

As seen in the above statistics, the crime case ratio on the street and in the residential area among the total sec crimes accounts for over ⅓, which means that the roadsides and the residential areas are a dead zone to the crimes. This can be confirmed from the statistics from Ministry of Justice of Korea.

In addition, according to the reports from media, a remote alley, a housing dense area, a street to school, etc. seem to be areas vulnerable to crimes. A number of places around us are exposed to various crimes.

A danger where ordinary persons may be exposed to violent crimes is increasing, but due to a random development of a city and a dense population, it is hard to construct a safe life environment which allows to build a city anticrime system. Even though such a city anticrime system is urgent, it is hard to withdraw an agreement on costs and optimum place selection. For this reason, the installation of the city anticrime system is making slow progress.

In recent years, an anticrime CCTV, etc. is being installed in each alley or roadside so as to prevent the occurrence of any crime, which could provide a measure with respect to crimes, however there are countless roadsides and residential areas which may be exposed to crimes. For this reason, it is not easy to select where such a system could be first installed in a corresponding area or where the system could be installed in the area. Only discussion is going on.

So, it urgently needs to develop a new anticrime system which is able to inhibit the occurrence of any crime and prevent any attempt of crime because the conventional art has a limit when a CCTV takes pictures and a problem where the photographed image quality is low, and it is impossible to provide any help at the time crime actually occurs.

In addition, most of vehicles are equipped with vehicle black boxes which take pictures the surroundings of the parked vehicle. The criminals may be arrested using such black boxes. The Korean Patent Registration number 10-1005568 discloses a smart type anticrime system using a vehicle.

The above smart type anticrime system is directed to using a vehicle which has a camera, so it can move anywhere, and the place where the vehicle parks can be a place where the anticrime system is installed. However, after the occurrence of a crime is recognized, the recognized crime is simply transferred to a police station or a hospital so as to cope with an emergency situation. More specifically, the above system lacks a direct prevention means with respect to crimes or any means for preventing any attempt of crimes.

Therefore, it still needs to develop a new type of an anticrime system which allows to provide a direct stimulation and impact to a criminal to the extent that the criminal can give up crime intention, which overcomes the problems encountered in the conventional system wherein the crime scene is simply photographed and the following measure is taken.

SUMMARY OF THE INVENTION

Accordingly, it is an object of the present invention to provide an anticrime system using a panic function of a vehicle wherein the system of the present invention is previously installed in a vehicle when the vehicle is being manufactured, and the panic function which could be used in the past by only a vehicle owner, can be used by others, namely, a potential victim who is exposed to a crime, a number of vehicles which move anywhere and may park anywhere in the city can be used as a city anticrime system which multiple persons can use at low cost and in easier installation ways.

To achieve the above objects, there is provided an anticrime system using a panic function of a vehicle, which may include, but is not limited to, a vehicle which has a panic function configured to ask others a help with respect to a dangerous situation; an emergency situation detection unit which is installed at an outer side of the vehicle and is formed of at least one sensor configured to receive an occurrence signal of the emergency situation from a victim who is in danger; a guard mode management unit which allows to set an entry state into the guard mode by controlling an activation state of the sensor which belongs to the emergency situation detection unit; an emergency situation recognition unit which is configured to determine an emergency situation occurrence stare in an area where a vehicle currently parks, based on a contact signal received from the sensor provided at the emergency situation detection unit in the guard mode; and a panic function activation unit which is configured to report a danger occurrence to surroundings by activating the panic function mounted on the vehicle if it is an emergency situation as a result of the determination of the emergency situation recognition unit.

At this time, it is characterized in that the emergency situation detection unit is formed of a touch sensor installed at a door knob of the vehicle, thus recognizing a contact signal of the victim who is in danger, and the emergency situation recognition unit is configured to determine that there is an emergency situation if a duration time period of the contact signal inputted into the touch sensor is in excess of a previously set time period.

In addition, the emergency situation detection unit is formed of a remote sensor which is installed at a door knob of the vehicle and is configured to recognize a state where the door knob is pulled, as a contact signal of the victim, and the emergency situation recognition unit is configured to determine, as the occurrence of an emergency situation, a state where the number of repetition of the contact signals inputted into the remote sensor is in excess of a previously set number.

There is preferably further provided an emergency situation report unit which is configured to transmit the occurrence of an emergency situation to a distant police station through a vehicle telematics system mounted on the vehicle, thus completing a report, if the emergency situation recognition unit determines that the emergency situation has occurred.

In addition, it is characterized in that there is further provided a vehicle position transmission unit which is configured to transmit the information of a position where the vehicle currently parks when the emergency situation report unit reports the occurrence of the emergency situation.

According to the present invention, there is provided an anticrime system using a panic function of a vehicle wherein the system of the present invention is previously installed in a vehicle when the vehicle is being manufactured, and the panic function which could be used in the past by only a vehicle owner, can be used by others, namely, a potential victim who is exposed to a crime, a number of vehicles which move anywhere and may park anywhere in the city can be used as a city anticrime system which multiple persons can use at low cost and in easier installation ways.

In addition, the present invention allows a potential victim, except for a vehicle owner, who is exposed to a crime, to activate a panic function of a vehicle which may park anywhere, thus providing a criminal with a panic state, so a potential criminal, who had a crime intention, can give up in the course of crime attempts, thus blocking or preventing any crime, so the optimum city anticrime system can be provided.

BRIEF DESCRIPTION OF DRAWING

FIG. 1 is a block diagram illustrating an anticrime system using a panic function of a vehicle according to the present invention.

DETAILED DESCRIPTION OF THE INVENTION

The exemplary embodiments of the present invention will be described with reference to the accompanying drawings.

FIG. 1 is a block diagram illustrating an anticrime system using a panic function of a vehicle according to the present invention.

Referring to FIG. 1, the anticrime system using a panic function of a vehicle according to the present invention may include, but is not limited to, a vehicle 100 which is equipped with a panic function configured to ask a help by informing others of a dangerous situation, an emergency situation detection unit 200 which is installed at an outer side of the vehicle and is formed of at least one sensor which can receive a generation signal of an emergency situation from a potential victim who is now in danger, a guard mode management unit 300 which allows to set an entry of a guard mode by controlling an activation state of a sensor which belongs to the emergency situation detection unit, an emergency situation recognition unit 400 which determines whether or not an emergency situation has occurred in an area where a vehicle parks, based on a contact signal from the sensor installed at the emergency situation detection unit in the guard mode, and a panic function activation unit 500 which is configured to activate a panic function mounted on the vehicle in case of the emergency situation as a result of the determination of the emergency situation recognition unit and to inform the occurrence of the danger to others being nearby.

The vehicle 100 is formed of a vehicle which is equipped with a panic function which is a honking device configured to output a warning sound so that others can ask help or warn a dangerous situation in case where a potential victim is being threatened by a stranger near a vehicle or is in a predetermined dangerous situation. At this time, if the panic function is activated, an irregular warning sound from a horn installed in the vehicle or an irregular high speed flickering/lighting of an emergency light, a head lamp, a tail lamp, an indoor light and other lamps may repeatedly output for a predetermined time period, so that an opponent may fear and give up any action.

The above panic function was provided in the foreign recent dramas or moves. In recent years, such panic functions are previously installed in the vehicles when the vehicles are manufactured so as to protect a vehicle owner from dangers.

The panic function mounted on the vehicle is designed to operate by a vehicle owner who has a smart key or when the vehicle owner is in the vehicle, so its user may be limited. However, in the present invention, the emergency situation detection unit is installed on an outer side of the vehicle so that others, except for the vehicle owner, can use. The activation state of the emergency situation detection unit can be directly controlled by the vehicle owner using the guard mode management unit, thus eliminating any potential inconvenience when in use, so the present invention may be popularly used as an anticrime system.

The emergency situation detection unit 200 is formed of at least one sensor which is installed at an outer side of the vehicle equipped with the panic function, namely, at a knob of a vehicle door where people may easily touch, and the activation state of the sensor can be controlled in accordance with a control of the guard mode management unit 300.

At this time, the emergency situation detection unit 200 may be formed of a touch sensor 210 which is installed at a knob of a vehicle door and is able to recognize any touch of a potential victim who is in danger or may be formed of a remote sensor 220 which is installed at a knob of a vehicle door and is configured to count the number that the knob is pulled.

If the emergency situation detection unit is formed of a touch sensor 210, the contact of the potential victim may be recognized when the potential victim who is in danger, grabs the knob, but there may be any problem that such a contact may not be recognized due to impurities on the touch sensor. For this reason, it is preferred that in order to obtain a stability in operation of the touch sensor, the contact should be recognized in accordance with an input of the contact signal only when the knob is pulled. In case where the emergency situation detection unit is formed of the touch sensor 210, it is preferred that the contact should be recognized as an emergency occurrence situation only when a contact signal input is continued for a predetermined time period, thus preventing any activation of the panic function when the knob of a vehicle door is simply grabbed and touched as usual during ordinary life.

If the emergency situation detection unit is formed of a remote sensor 220, a contact signal may generate whenever two sensors installed at the door and the knob of the vehicle and separate from each other as the knob is pulled. In case where the emergency situation detection unit is formed of the remote sensor 220, it is preferred that the contact should be recognized as an emergency situation only when the input of the contact signal continues predetermined times, thus preventing any activation of the panic function which may occur as a person simply pulls the knob for the use of the vehicle during an ordinary life.

Since the emergency situation detection unit 200 is installed at an outer side of the vehicle, and the use of the emergency situation detection unit 200 is freely open to multiple persons who may be in danger. The place where the vehicle parts may be the place where the anticrime system of the present invention is installed, thus overcoming a spatial limitation when installing the anticrime system.

The guard mode management unit 300 may be configured to set the activation state of the emergency situation detection unit so that the reception state of the contact signal through the touch sensor or the remote sensor can be controlled.

Therefore, when the emergency situation detection unit is activated by operating the guard mode management unit 300 as the operation enters the guard mode, the touch sensor or the remote sensor forming the emergency situation detection unit 200 is activated, and an externally inputting contact signal will be received and transmitted to the emergency situation recognition unit 400.

However, if the vehicle owner blocks the entry into the guard mode, the touch sensor or the remote sensor forming the emergency situation detection unit may remain inactivated. In this state, even though a contact signal is externally received, such signal is not transmitted to the emergency situation recognition unit, thus blocking any activation of the panic function.

In this way, the system may be configured in such a way that the vehicle owner can directly control the activation state of the emergency situation detection unit using the guard mode management unit 300. Otherwise, the system may be configured in such a way that the operation can automatically enter the guard mode as the vehicle owner ends the operation of the vehicle and turns of the engine and locks all the door.

When the vehicle owner unlocks the locked state of the vehicle using a remote controller key or a smart key to use the vehicle which is in the guard mode, it is preferred that the guard mode can be also automatically unlocked, not causing any inconvenience when using the vehicle.

The emergency situation recognition unit 400 may be configured to determine whether or not an emergency situation has occurred based on the repeating times or the duration time period of the contact signal if the contact signal generating as the knob of the vehicle door is pulled or touched is externally received in a state where the emergency situation detection unit 200 is activated as the operation has entered the guard mode by the guard mode management unit 300.

Therefore, in case where the emergency situation detection unit is formed of a touch sensor 210, if the contact signal received through the touch sensor in the guard mode continues for a predetermined time period, for example, 10 seconds, it may be determined that an emergency situation has occurred in the area where a corresponding vehicle parks.

In case where the emergency situation detection unit is formed of a remote sensor 220, it may be determined that an emergency situation has occurred in the area where a corresponding vehicle parks, in such a way to count the number of the contact signals inputted through the remote sensor in the guard mode, namely, the number of the remote signals generating as a person repeatedly pulls the knob and if the counted number is repeatedly inputted, for example, 5 times.

The panic function activation unit 500 may be configured to activate the panic function mounted on the vehicle and to honk and enable for a predetermined time period an emergency lamp, a head lamp, a tail lamp, an indoor lamp and various lamps to flicker rapidly and irregularly or to emit light. To this end, it is possible to panic a criminal who has attempted to hurt a victim as the victim inputs a contact signal so as to spread the occurrence of an emergency situation.

The activated panic function may be forcibly topped by the vehicle owner using a remote controller key or a smart key or the system is configured to stop the activated panic function after a predetermined time period long enough for the victim to escape from any attempt of crime passes. If a potential victim is exposed to multiple criminals, the panic function may be forcibly stopped by any of the multiple criminals. To this end, it is preferred that there is not provided a panic function stop means which could be easily operated outside the vehicle.

In the present invention, the panic function mounted for the sake of a vehicle owner is open to anonymous people, so the present invention has effect on the provision of anticrime systems anywhere the vehicles park.

In addition, the anticrime system using a panic function of the vehicle according to the present invention may further include an emergency situation report unit 600 for transmitting the occurrence of an emergency situation to a distant place through a vehicle telematics system mounted on the vehicle, thus completing a report.

Most of the vehicles which are currently sold are equipped with a vehicle telematics system operating based on a wireless communication. Since the vehicle telematics system is designed to operate based on a wireless communication, functions, for example, a telephone calling a vehicle position transmission, a SOS situation automatic report to an emergency agency and a control center if an accident occurs, etc. are available.

The emergency situation report unit 600 may basically activate the panic function if the emergency situation recognition unit 400 recognizes that a predetermine emergency situation has occurred with the aid of the vehicle telematics system operating based on a wireless communication mounted on the vehicle, and may be further configured to urgently transmit the occurrence of the emergency situation to a nearby police station or a nearby police substation. In this way, since the position of a potential victim who is being threatened by a criminal is immediately reported through the vehicles, the criminal may run away, not trying to hurt the potential victim, thus protecting the potential victim from the crime.

In addition, the anticrime system using the panic function of a vehicle according to the present invention may further include a vehicle position transmission unit 700 which is able to transmit an information on the place where the vehicle parks when the emergency situation report unit reports the occurrence of an emergency situation.

To this end, the potential victim being in danger can quickly and accurately transmit, through the vehicle position transmission unit, the position information of the position currently exposed to a danger, so the potential victim can quickly escape from the emergency situation.

The above-mentioned telematics system has been a convenient system which is designed to protect a vehicle owner from any danger which might occur in the course of running or could be activated by only the vehicle owner. In the present invention, such a telematics system may be used for a potential victim being exposed to a crime to easily access and use it in an area where the vehicle parks, with the aid of the emergency situation report unit and the vehicle position transmission unit, so the effects of the provision of the anticrime system can be obtained anywhere the vehicles park.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

LEGEND OF REFERENCE NUMBER

100: vehicle
200: emergency situation detection unit
210: touch sensor
220: remote sensor
300: guard mode management unit
400: emergency situation recognition unit
500: panic function activation unit
600: emergency situation report unit
700: vehicle position transmission unit

The invention claimed is:

1. An anticrime system using a panic function of a vehicle, comprising:
    a vehicle which has a panic function configured to ask others for help with respect to a dangerous situation;
    an emergency situation detection unit which is installed at an outer side of the vehicle and is formed of at least one sensor configured to receive an occurrence signal of an emergency situation from a victim who is in danger;
    a guard mode management unit which allows to set an entry state into a guard mode by controlling an activation state of the sensor which belongs to the emergency situation detection unit;
    an emergency situation recognition unit which is configured to determine an emergency situation occurrence state in an area where a vehicle currently parks, based on a contact signal received from the sensor provided at the emergency situation detection unit in the guard mode; and
    a panic function activation unit which is configured to report a danger occurrence to surroundings by activating a panic function mounted on the vehicle if it is an emergency situation as a result of the determination of the emergency situation recognition unit,
    wherein the emergency situation detection unit is formed of a touch sensor installed at a door knob of the vehicle, thus recognizing a contact signal of the victim who is in danger, and the emergency situation recognition unit is configured to determine that there is an emergency situation if a duration time period of the contact signal inputted into the touch sensor is in excess of a previously set time period.

2. The system of claim 1, wherein
the guard mode management unit is configured to allow a vehicle owner to directly set an activation state of each sensor which forms the emergency situation detection unit.

3. The system of claim 1, wherein
the guard mode management unit is configured to allow the system to automatically enter into the guard mode when an engine of the vehicle is turned off, and all doors are locked.

4. The system of claim 1, further comprising:
an emergency situation report unit which is configured to transmit the occurrence of an emergency situation to a distant police station through a vehicle telematics system mounted on the vehicle, thus completing a report, if the emergency situation recognition unit determines that the emergency situation has occurred.

5. The system of claim 4, further comprising:
a vehicle position transmission unit which is configured to transmit the information of a position where the vehicle currently parks when the emergency situation report unit reports the occurrence of the emergency situation.

6. An anticrime system using a panic function of a vehicle, comprising:
    a vehicle which has a panic function configured to ask others for help with respect to a dangerous situation;
    an emergency situation detection unit which is installed at an outer side of the vehicle and is formed of at least one sensor configured to receive an occurrence signal of an emergency situation from a victim who is in danger;
    a guard mode management unit which allows to set an entry state into a guard mode by controlling an activation state of the sensor which belongs to the emergency situation detection unit;
    an emergency situation recognition unit which is configured to determine an emergency situation occurrence state in an area where a vehicle currently parks, based on a contact signal received from the sensor provided at the emergency situation detection unit in the guard mode; and
    a panic function activation unit which is configured to report a danger occurrence to surroundings by activating a panic function mounted on the vehicle if it is an emergency situation as a result of the determination of the emergency situation recognition unit,
    wherein the emergency situation detection unit is formed of a remote sensor which is installed at a door knob of the vehicle and is configured to recognize a state where the door knob is pulled, as a contact signal of the victim, and the emergency situation recognition unit is configured to determine, as the occurrence of an emergency situation, a state where number of repetition of the contact signals inputted into the remote sensor is in excess of a previously set number.

7. The system of claim 6, wherein the guard mode management unit is configured to allow a vehicle owner to directly set an activation state of each sensor which forms the emergency situation detection unit.

8. The system of claim 6, wherein the guard mode management unit is configured to allow the system to automatically enter into the guard mode when engine of the vehicle is turned off, and all doors are locked.

9. The system of claim 6, further comprising:
an emergency situation report unit which is configured to transmit the occurrence of an emergency situation to a distant police station through a vehicle telematics system mounted on the vehicle, thus completing a report, if the emergency situation recognition unit determines that the emergency situation has occurred.

* * * * *